(12) United States Patent
Philipp

(10) Patent No.: US 6,808,355 B2
(45) Date of Patent: Oct. 26, 2004

(54) CHAIN STORE AND PROCESS FOR UNLOADING IT

(75) Inventor: Kurt Philipp, Rheinfelden (DE)

(73) Assignee: Rotzinger AG, Kaiseraust (CH)

( * ) Notice: Subject to any disclaimer, the term of this patent is extended or adjusted under 35 U.S.C. 154(b) by 155 days.

(21) Appl. No.: 10/215,176

(22) Filed: Aug. 7, 2002

(65) Prior Publication Data

US 2003/0223845 A1 Dec. 4, 2003

(30) Foreign Application Priority Data

May 28, 2002 (CH) ............................................ 0887/02

(51) Int. Cl.$^7$ ................................................ B65G 1/00
(52) U.S. Cl. ............................ 414/331.04; 414/331.05; 414/331.16
(58) Field of Search ........................ 414/331.04, 331.05, 414/331.14, 331.16, 331.17, 331.18, 331.02, 247, 248, 249, 251

(56) References Cited

U.S. PATENT DOCUMENTS

| | | | | |
|---|---|---|---|---|
| 5,110,248 A | * | 5/1992 | Asano et al. | ................ 414/172 |
| 5,405,240 A | * | 4/1995 | Uno | ........................ 414/794.2 |
| 5,501,564 A | * | 3/1996 | Doche | ................... 414/331.13 |
| 5,595,263 A | * | 1/1997 | Pignataro | ..................... 186/53 |
| 5,855,465 A | * | 1/1999 | Boitnott et al. | ......... 414/331.18 |
| 6,048,154 A | * | 4/2000 | Wytman | ..................... 414/217 |
| 6,099,230 A | * | 8/2000 | Hitch | .................... 414/331.02 |
| 6,158,944 A | * | 12/2000 | Boyd et al. | ............ 414/331.14 |
| 6,223,975 B1 | * | 5/2001 | Blohmann et al. | .......... 228/232 |
| 6,474,925 B1 | * | 11/2002 | Ormerod et al. | ....... 414/331.16 |
| 6,619,903 B2 | * | 9/2003 | Friedman et al. | ...... 414/331.14 |

* cited by examiner

Primary Examiner—Christopher P Ellis
Assistant Examiner—Rashmi Sharma
(74) Attorney, Agent, or Firm—Sidley Austin Brown & Wood, LLP

(57) ABSTRACT

A chain store comprising a plurality of intermittently movable gondolas which serve for receiving products to be stored and are suspended and fastened on at least one articulated chain running vertically over a plurality of deflection rollers, and a plurality of shelves which serve for receiving the products, and at least one unloading station which is arranged on an upward- or downward-moving outer side of the chain store and has transfer means for ejecting the products onto a horizontal discharge belt leading away from the unloading side, wherein the transfer means has two ejectors for simultaneously ejecting products from in each case two shelves one on top of the other, wherein a storage plate which is fastened with its end facing away from the gondola train to a retaining apparatus and is pivotable from a horizontal into a skew position inclined toward the discharge belt and is displaceable away from the gondola train is provided above the discharge belt, wherein the storage plate has rake-like or comb-like teeth extending toward the gondola train, wherein furthermore a vertical product stop having rake-like or comb-like teeth extending upward is provided and wherein the transfer device, the discharge belt, the storage plate and the product stop are arranged and dimensioned in such a way that, during ejection of the products, the lower product or the lower product row is pushed onto the discharge belt and the upper product or the upper product row is simultaneously pushed onto the horizontal storage plate, and that each tooth of the product stop can be passed over its total length through the space between two adjacent teeth of the storage plate.

5 Claims, 2 Drawing Sheets

CHAIN STORE AND PROCESS FOR UNLOADING IT

BACKGROUND OF THE INVENTION

1. Field of the Invention

The invention relates to a chain store and a process for unloading the chain store, namely a chain store according to the preamble of claim 1 and a process according to the preamble of claim 4.

The chain store and the process can be used for the temporary storage of products of the same type.

The products may be, for example, chocolate bars which are transported from a production apparatus to at least one packaging apparatus. However, the product may consist not of chocolate bars but of other sweet or nonsweet foods in the form of pieces, for example bakery articles, or of cans or other containers having any filling or of components for mechanical engineering, for example ball bearings, which are transported to a packaging apparatus or other processing apparatus.

2. Description of the Prior Art

In the case of known means for the production and packing of chocolate bars, the bars produced by a production apparatus are transported via a feed belt to chain stores and then through these to packaging apparatuses. Each chain store can be formed, for example, approximately according to DE 90 12 074 U and serves as a compensating apparatus for compensating variations in the feed rate of bars or the packing rate of the packing apparatus and complete stoppages of operation of the production apparatus or of the packing apparatus, for example lasting for 5 min to 45 min. A chain store of this type typically has 150 to about 1200 gondolas attached to two continuous chains and having a plurality of shelves for holding one row of bars each. Each chain is deflected by a plurality of chain wheels mounted in a frame and by a plurality of chain wheels mounted on vertically displaceable carriages and forms a number of loops.

In the case of known chain stores for the temporary storage of articles on gondolas suspended from two chains, those chains of the loading and unloading side which are each driven by a drive motor are intermittently moved, i.e. they are stationary while articles are being loaded onto the shelves at the loading station and are being unloaded again from the shelves at the unloading station. The store operates according to the "first-in"/"first-out" principle and makes it possible in particular to operate infeed and outflow at different speeds.

Up to now, a chain store has been emptied at the outflow only at one discharge level, i.e. the product rows are pushed by an ejector from the shelf level onto a discharge belt leading away and are then transported away laterally. This simple arrangement permits a discharge rate of about 30 rows per minute. The chain store operates as follows: as soon as a first shelf reaches the unloading station, the drive motor of the unloading side is switched off or the corresponding drive drum is disengaged from the gear so that the shelf remains stationary at the height of the discharge belt leading away. The articles are then transferred by means of the horizontally displaceable ejector to the continuously moving or, during the transfer, stationary discharge belt, depending on requirements. As soon as this transfer process is complete, the movement of the chains is switched on again so that the next shelf reaches the unloading station and the process described above can be repeated.

These known unloading apparatuses for chain stores have the disadvantage that, for each unloading process during which only one shelf level is unloaded in each case, the corresponding chain drive apparatuses are switched off, with the result that not only is the effective transport speed of the unloading side of the chain store reduced but also disadvantageous rocking movements of the shelves whose suspension apparatuses run over a deflection roller occur.

A further problem is that, with increasing production rate, the loading capacity and unloading capacity of the chain stores also have to be increased. Various solutions have already become known for increasing the loading capacity. In contrast to loading, the goods have to be transported from a rest position of the respective shelf to the discharge belt during unloading, which is possible only by means of an ejector. The unloading frequency is accordingly limited by the time which the ejector requires for returning to the original position for the next ejection, and also by the frequency with which the shelves are transported past the discharge belt.

SUMMARY OF THE INVENTION

It is the object of the invention to provide a chain store comprising a novel unloading station which in particular makes it possible to unload the articles relatively rapidly and with the saving of time from the shelves of the store, in order thus to achieve up to 50% higher discharge performance compared with known unloading stations.

This object is achieved by a chain store comprising
- a plurality of intermittently movable gondolas which serve for receiving products to be stored and are suspended and fastened on at least one articulated chain running vertically over a plurality of deflection rollers, and at least one shelf which serves for receiving the products, and
- at least one unloading station which is arranged on an upward- or downward-moving outer side of the chain store and has transfer means for ejecting the products onto a horizontal discharge belt leading away from the unloading side,
- wherein the transfer means has two ejectors for simultaneously ejecting products from in each case two shelves one on top of the other, wherein a storage plate which is fastened with its end facing away from the gondola train to a retaining apparatus and is pivotable from a horizontal into a skew position inclined toward the discharge belt and is displaceable away from the gondola train is provided above the discharge belt, wherein the storage plate has rake-like or comb-like teeth extending toward the gondola train, wherein furthermore a vertical product stop having rake-like or comb-like teeth extending upward is provided and wherein the transfer means, the discharge belt, the storage plate and the product stop are arranged and dimensioned in such a way that, during ejection of the products, the lower product or the lower product row is pushed onto the discharge belt and the upper product or the upper product row is simultaneously pushed onto the horizontal storage plate, and that each tooth of the product stop can be passed over its total length through the space between two adjacent teeth of the storage plate.

A further object of the invention is a process for unloading a chain store as mentioned above, comprising gondolas which have a plurality of shelves for receiving one product row each, wherein, during ejection of in each case two product rows stored one on top of the other, the lower row is pushed onto the discharge belt and the upper row is pushed onto the swivelled-up storage plate, wherein, as soon as there is space on the discharge belt, the storage plate is swivelled down onto the discharge belt and is simultaneously or subsequently drawn through the teeth of the product stop, away from the gondola train, the product row being pushed through the teeth of the product stop onto the discharge belt.

BRIEF DESCRIPTION OF THE DRAWINGS

The subject of the invention and advantages thereof are illustrated below with reference to an embodiment shown in the drawing. In the drawing.

DESCRIPTION OF THE PREFERRED EMBODIMENTS

Figure 1:
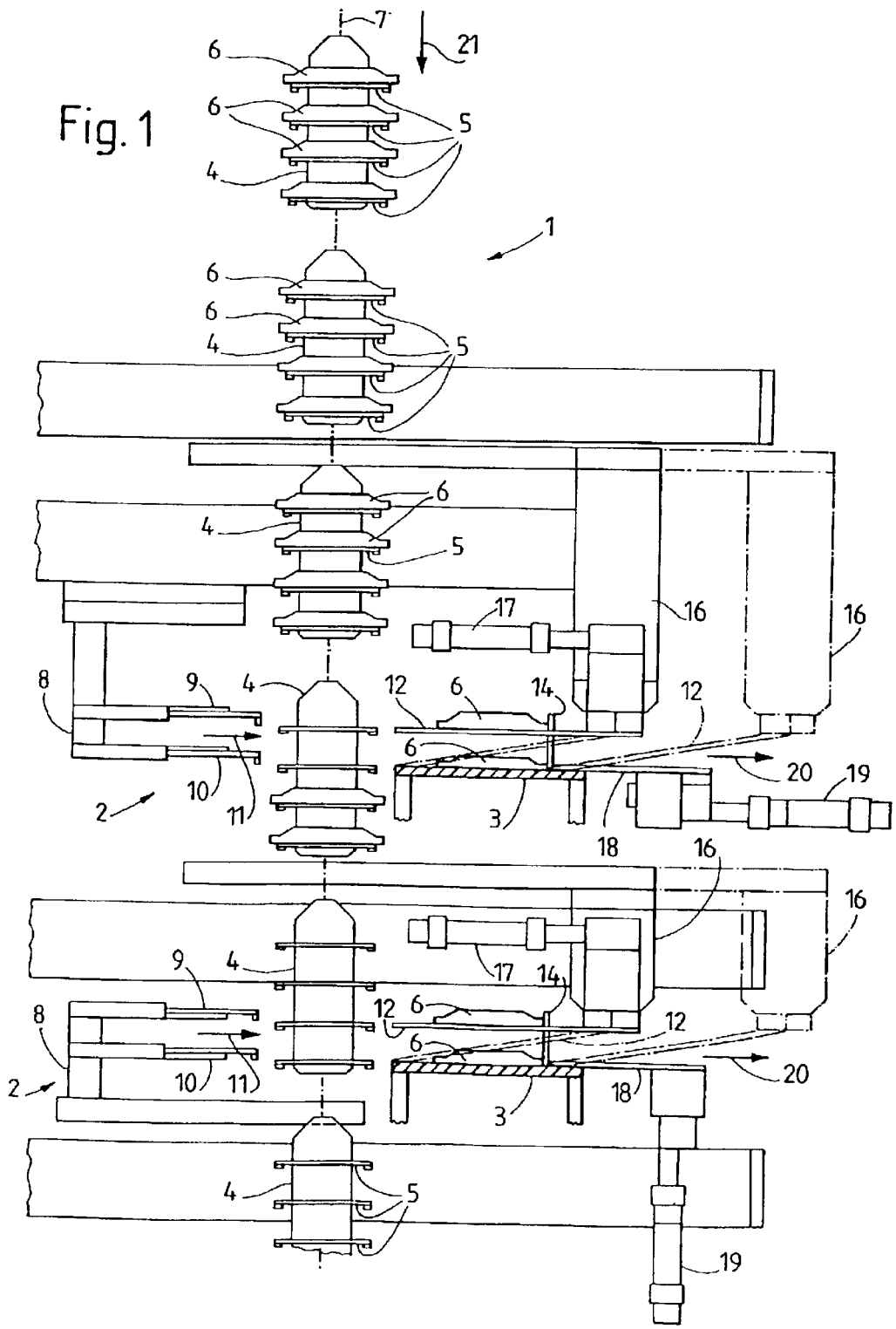
FIG. 1 shows an unloading side of a chain store comprising two unloading stations which are arranged one on top of the other and each of which has two ejection levels.

FIG. 1 shows an unloading side 1 of a chain store and two associated unloading stations 2, which in turn each have, as a substantial element, a discharge belt 3 leading away horizontally.

The chain store is formed, for example, as described in detail in DE-G 90 12 074.4. In the embodiment shown, the gondolas 4 are inherently stable bodies each consisting of four product support plates or shelves 5 on which the products 6 or product rows can be supported and transported. The gondolas 4 are preferably suspended and fastened with bolts on one continuous chain pair 7 each, so that they always maintain their vertical position regardless of the position of the chains 7. They are moreover of low weight and can be relatively rapidly attached and removed manually. This is an important advantage from the hygiene point of view if it is intended to change or clean the gondolas 4, for example in the case of a change of product.

Each unloading station 2 furthermore has transfer means 8 for transferring the products 6 row by row from the shelves 5 to the discharge belt 3. According to the invention, the transfer means 8 each have two controllable ejectors 9 and 10 which are horizontally displaceable together from a rest position in the direction of arrow 11 by a control apparatus having a pneumatic cylinder or an electric motor. Thus, each unloading station 2 is provided with a double pusher bar with which in each case two product rows can be simultaneously ejected from shelves 5 located one on top of the other. The lower row is transferred to the discharge belt 3. The upper row is simultaneously pushed onto a horizontally aligned storage plate 12 which is provided.

The following description relates to one of the two unloading stations 2. Of course, the corresponding statements also apply in context to the second station.

Figure 2:
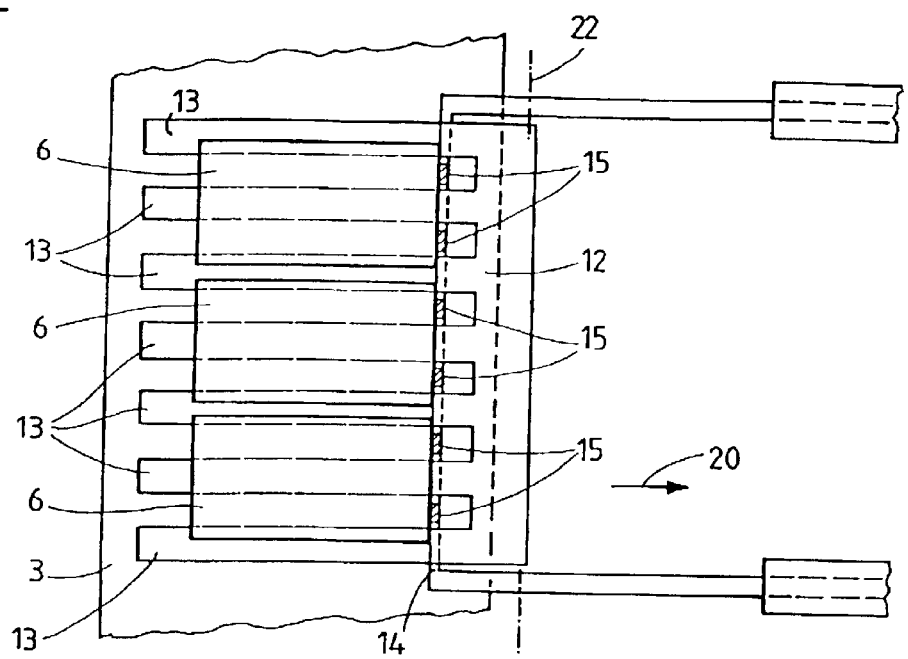
FIG. 2 shows a plan view of the gondola discharge side of an unloading station with a storage plate swivelled up and forming the upper ejection level.
Figure 3:
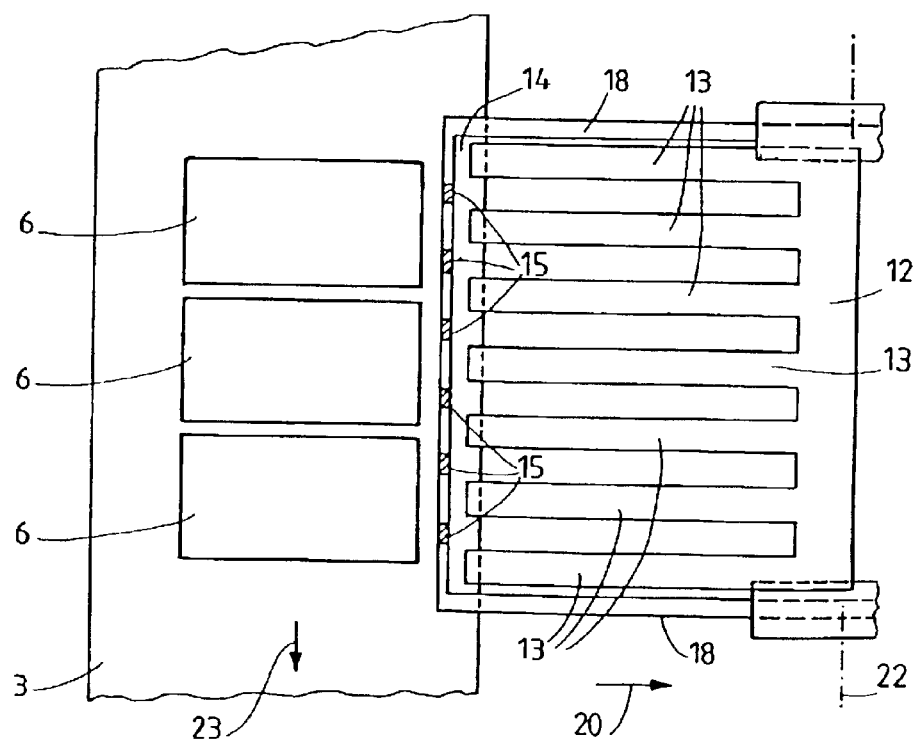
FIG. 3 shows a plan view of the gondola discharge side with the storage plate swivelled down onto the discharge belt and retracted horizontally.

As shown in particular in FIGS. 2 and 3, the storage plate 12 has rake-like or comb-like teeth 13 extending toward the gondola train. The unloading station 2 furthermore has a vertical product stop 14, likewise having rake-like or comb-like teeth 15 extending upward. The storage plate 12 and the product stop 14 are now arranged and dimensioned in such a way that each tooth 15 of the product stop 14 can be passed over its total length through the space between two adjacent teeth 13 of the storage plate 12.

As can furthermore be seen from FIGS. 1 to 3, the storage plate 12 is pivotably fastened at its end facing away from the gondola train to a retaining apparatus 16 and can be swivelled by means of a cylinder 17 from a horizontal position into a skew position in which it is swivelled down onto the discharge belt 3, and the vertical product stop 14 is connected via a support profile 18 to a cylinder apparatus 19 and is horizontally displaceable by means of this by a distance required for releasing the product row, in the direction of an arrow 20.

During the operation of the unloading apparatus 2, the gondola train of the unloading side 1 is driven by a motor which is not shown, so that it travels past the unloading station from top to bottom, in the direction of an arrow 21. The drive motor of the unloading side 1—as well as the drive motors of the loading side and of the discharge belt, the cylinders 17 and 18 and the horizontally displaceable retaining apparatus 16—is connected via an electrical control line to a central control unit which is not shown. The latter is part of the total production plant consisting of production apparatus, conveyor belts, chain store and packing apparatus. It has, for example, manually actuatable control elements, electronic elements, for example at least one digital processor, display and recording devices, data stores and possibly pneumatic and/or hydraulic control elements, such as valves and the like. Further electrical cables and possibly fluid lines additionally connect the control unit to the production apparatus, the packing apparatus and the drive and/or control apparatuses of the various additional conveyor belts.

The unloading process according to the invention will now be explained in more detail with reference to an unloading station 2.

At the unloading station 2, in each case two product rows are removed from the store by means of the pushers 9 and 10 and are fed via a discharge belt 3 to the downstream packing machine. For this purpose, the gondola train is positioned in a synchronized manner at the discharge level so that in each case two product rows can be ejected simultaneously. The lower row is transferred directly onto the discharge belt 3. The upper row is simultaneously pushed onto the swivelled-up storage plate 12. The teeth 15 of the product stop 14, which are passed through the spaces between two adjacent teeth 13 of the storage plate 12, align the two ejected product rows both with the storage plate 12 and with the discharge belt 3. After reaching the aligned ejection position, the product stop 15 is vented, i.e. pulled away or swivelled away from the gondola train in the direction of arrow 20, so that the product row already present on the discharge belt 3 for being transported away can be fed without deflection to the packing machine, in the direction of arrow 23.

As soon as there is space on the discharge belt 3, the upper product row waiting on the storage plate 12 is placed on the discharge belt 3, this being effected as follows: first, the product stop 14 is swivelled back or pushed into its starting position. The storage plate 12 is then swivelled downward about the axis 22 onto the discharge belt 3 by means of the cylinder 17 and simultaneously or subsequently drawn away from the gondola train by means of a horizontal drive not shown in detail, in the direction of arrow 20. During this, the teeth 15 of the product stop 14 push the product row from the storage plate 12, to such an extent that they rest without deflection on the discharge belt 3 and can be transported away in the direction of arrow 23.

While the second product row is being transported away, the storage plate 12 is swivelled back upward and is pushed by means of the horizontal drive in the direction of the gondola train, back into the horizontal receiving position, so that two further product rows can be unloaded.

The means according to the invention for unloading a chain store can be modified in various ways. Thus, one unloading station 2 or—as shown—two or even three unloading stations 2 of the type described can alternatively be arranged flush above or below one another in order on the one hand to adapt the unloading capacity to the production and packing speed and, on the other hand, to load one, two or three packing apparatuses with product rows.

What is claimed is:

1. A chain store, comprising:

a plurality of intermittently movable gondolas for receiving products to be stored, suspended and fastened on at least one articulated chain running vertically over a plurality of deflection rollers, and having at least one shelf for receiving the products; and at least one unloading station which is arranged on an upward- or downward-moving outer side of the chain store and has transfer means for ejecting the products onto a horizontal discharge belt leading away from the outer side, wherein, the transfer means has two ejectors for simultaneously ejecting products from in each case two shelves one on top of another, wherein a storage plate, which has an end thereof facing away from a gondola tram fastened to a retaining apparatus, is pivotable from a horizontal position into a skew position inclined toward the discharge belt, is displaceable away from the gondola train, and is provided above the discharge belt, wherein the storage plate has a rake-like or comb-like teeth extending toward the gondola train, wherein a vertical product stop having rake-like or comb-like teeth extended upward is provided, wherein the transfer means, the discharge belt, the storage plate and the product stop are arranged and dimensioned in such a way that, during ejection of the products, a lower product or an lower product row is pushed onto the discharge belt and an upper product or an upper product row is simultaneously pushed onto the horizontally extending storage plate, and wherein each tooth of the product stop can be passed over its total length through a space between two adjacent teeth of the storage plate.

2. The chain store a claimed in claim 1, wherein the vertical product stop is connected via a support profile to a cylinder apparatus for displacing the vertical product stop away from the gondola train by a distance required for releasing a new product.

3. The chain store as claimed in claim 1, further comprising two or six more identical unloading stations arranged above or below one another flush along the outer side.

4. A process for unloading a chain store comprising gondolas which have a plurality of shelves for receiving each one product row, wherein, during ejection of, in each case, two product rows stored one on top another, a lower product row is pushed onto a discharge belt, and an upper product row is pushed onto a pivoted-up storage plate, wherein, as soon as there is space on the discharge belt, the storage plate is swiveled down onto the discharge belt and is simultaneously or subsequently drawn through teeth of a product stop, away from a gondola train, the product row being pushed through the teeth of the product stop onto the discharge belt.

5. The process claimed in claim 4, wherein the teeth of the product stop which are passed through spaces between two adjacent teeth of the storage plate align the two ejected product rows both with the storage plate and with the discharge belt, and wherein, after reaching the aligned ejection position, the product stop is vented, by being swiveled away from the gondola train, so that the product row present on the discharge belt ready for being transported away can be transported away without deflection.

* * * * *